(12) United States Patent
Wang

(10) Patent No.: US 10,061,435 B2
(45) Date of Patent: Aug. 28, 2018

(54) HANDHELD DEVICE WITH ONE-HANDED INPUT AND INPUT METHOD

(71) Applicant: NANNING FUGUI PRECISION INDUSTRIAL CO., LTD, Nanning (CN)

(72) Inventor: Wei-Jeng Wang, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 0 days.

(21) Appl. No.: 15/381,126

(22) Filed: Dec. 16, 2016

(65) Prior Publication Data

US 2018/0173360 A1    Jun. 21, 2018

(51) Int. Cl.
*G06F 3/041* (2006.01)
*G06F 3/0488* (2013.01)
*G06F 3/023* (2006.01)

(52) U.S. Cl.
CPC .......... *G06F 3/0416* (2013.01); *G06F 3/0233* (2013.01); *G06F 3/0412* (2013.01); *G06F 3/04886* (2013.01)

(58) Field of Classification Search
CPC .... G06F 3/0415; G06F 3/0233; G06F 3/0412; G06F 3/04886
See application file for complete search history.

(56) References Cited

U.S. PATENT DOCUMENTS

2016/0202903 A1* 7/2016 Gutowitz ............ G06F 3/04886
715/771
2016/0357304 A1* 12/2016 Hatori ................... G06F 3/0237

FOREIGN PATENT DOCUMENTS

TW    200821904 A    5/2008
TW    201626253 A    7/2016

* cited by examiner

*Primary Examiner* — Lisa Landis
(74) *Attorney, Agent, or Firm* — ScienBiziP, P.C.

(57) ABSTRACT

A handheld device allowing comprehensive touch input on a small part of a large display screen includes a touch screen, a display, a touch sensor, and a control module. The handheld device enters to a first input mode in response an operation on the touch screen. The control module controls the display to display a first virtual keyboard, an input operation area, and a character input area in the first mode. In response to operations in the input operation area, the display displays a character of the first virtual keyboard in the character input area. An input method is also disclosed.

20 Claims, 14 Drawing Sheets

Display a changing area, a first virtual keyboard, an input operation area and a character input area, the first virtual keyboard includes a center area and a number of character selecting areas surrounding the center area, each character selecting area includes a number of characters, each character selecting area is positioned a first preset angle range of a coordinate with a center point of the center area being an original of the coordinate, the changing area surrounds the character selecting area, each changing area displays a character class — 116

Sense a first distance between the touch start point and present touch point along the first direction in real time — 117

When the first distance reaches to a first preset distance, display characters of the character class of the changing area surrounding the determined character selecting area in each character selecting area — 119

FIG. 12

HANDHELD DEVICE WITH ONE-HANDED INPUT AND INPUT METHOD

FIELD

The subject matter herein generally relates to input method on handheld devices.

BACKGROUND

Handheld devices, for example phones, have a big display screen which is often operated with one hand. If the display is touched to input words, a big display screen makes it very difficult to use a finger of one hand to do the inputting.

BRIEF DESCRIPTION OF THE DRAWINGS

Implementations of the present technology will now be described, by way of example only, with reference to the attached figures.

FIG. 12 is a flowchart of an input method applied to the device of FIG. 1, according to a second embodiment.

DETAILED DESCRIPTION

Figure 1:
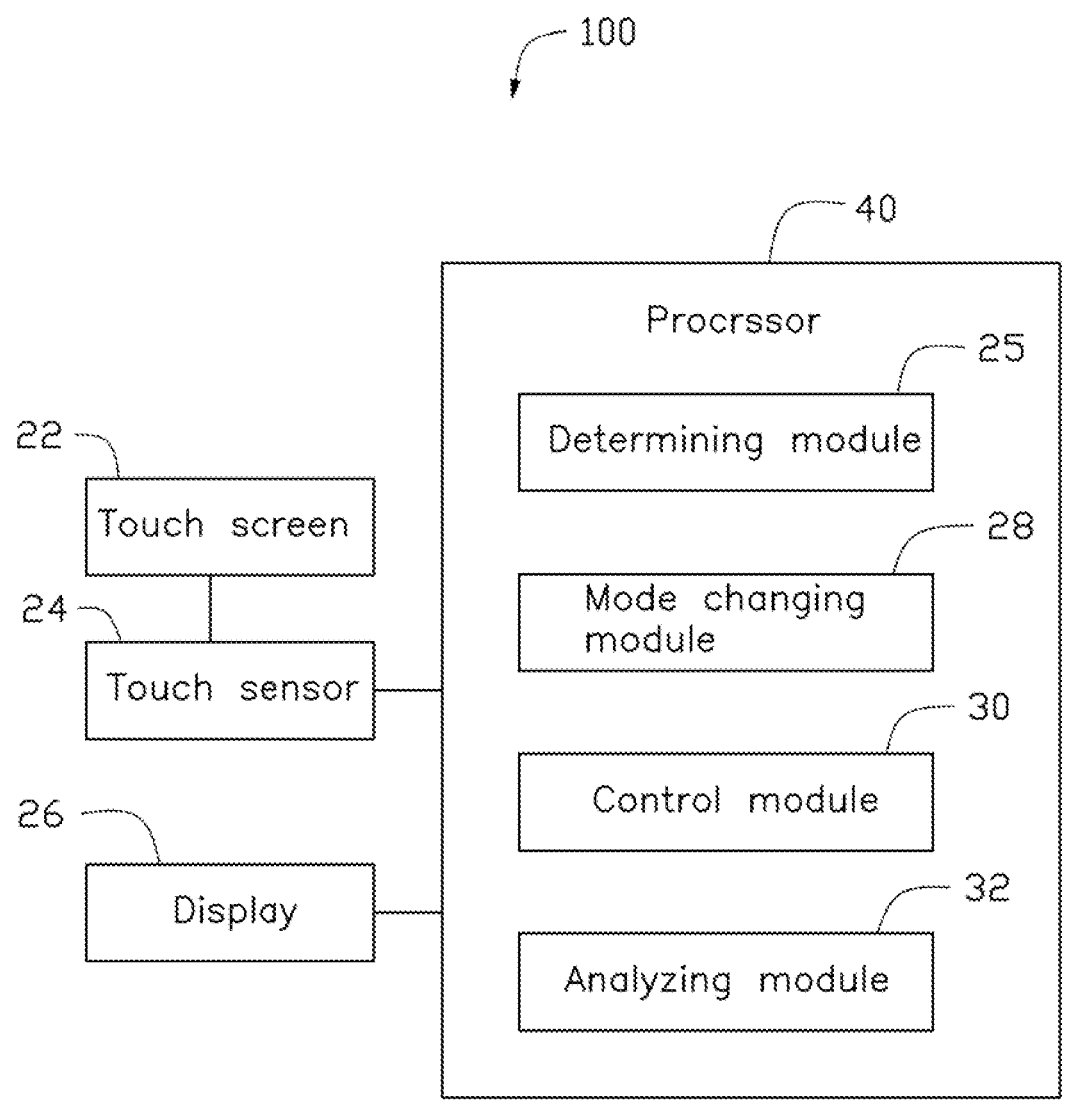
FIG. 1 is a block diagram of a handheld device.

It will be appreciated that for simplicity and clarity of illustration, where appropriate, reference numerals have been repeated among the different figures to indicate corresponding or analogous elements. In addition, numerous specific details are set fourth in order to provide a thorough understanding of the s described herein. However, it will be understood by those of ordinary skill in the art that the s described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the s described herein.

A definition that applies throughout this disclosure will now be presented.

The term "comprising" means "including, but not necessarily limited to"; it specifically indicates open-ended inclusion or membership in a so-described combination, group, series, and the like.

Figure 2:
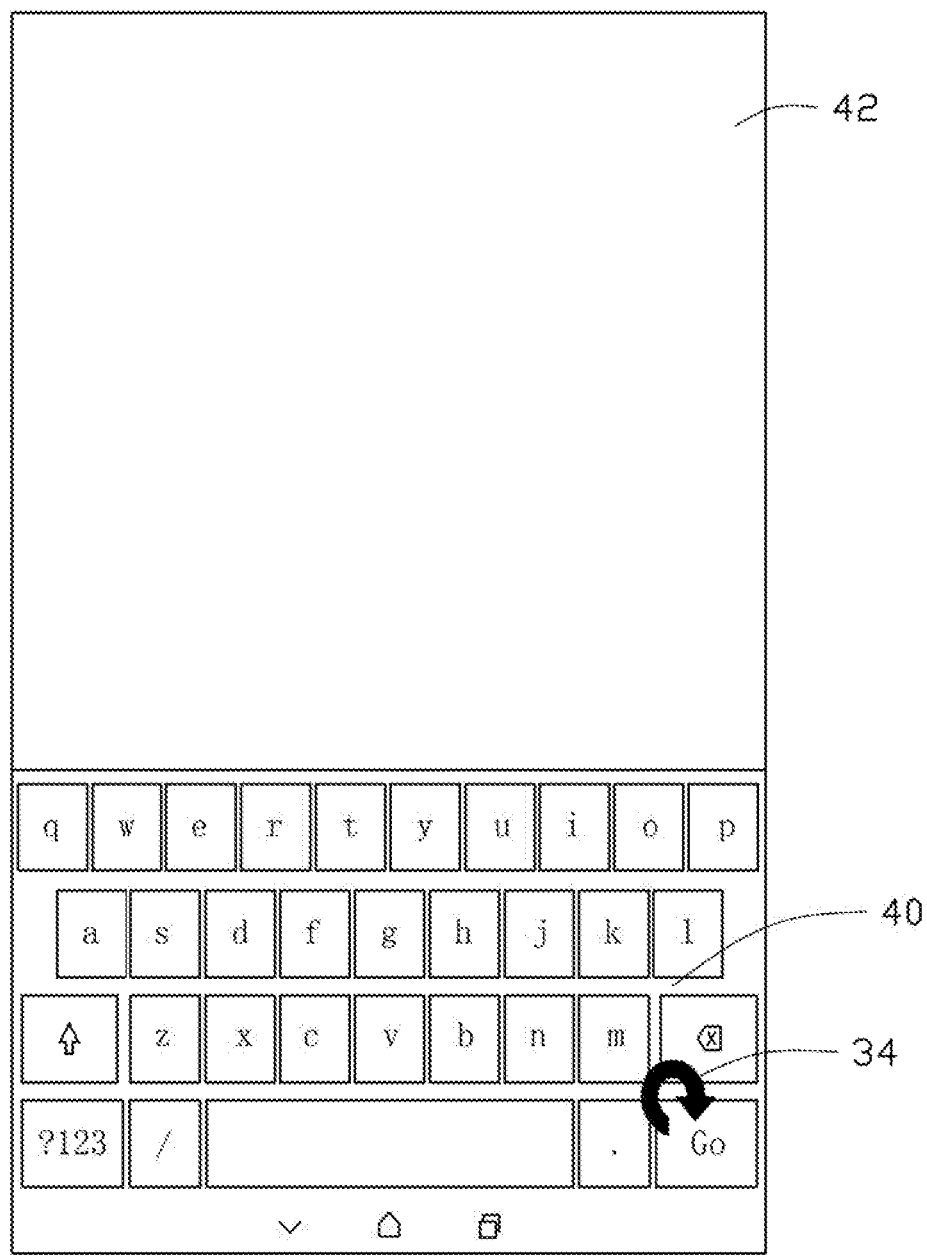
FIG. 2 is a schematic diagram of the handheld device of FIG. 1 in a second input mode.
Figure 3:
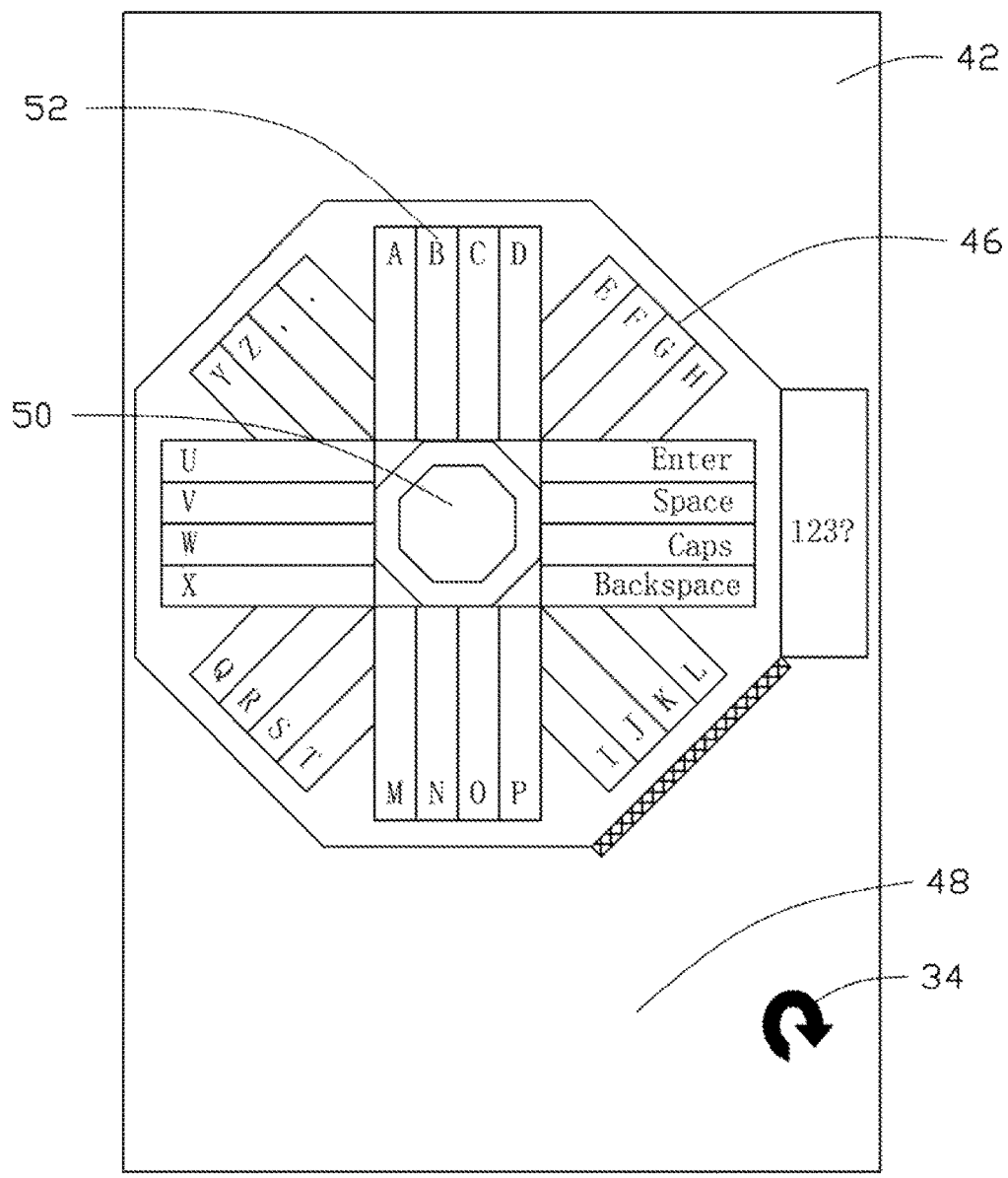
FIG. 3 is a schematic diagram of the handheld device in FIG. 1 in a first input mode.

FIGS. 1-3 illustrate a handheld device 100 which includes a touch screen 22, a touch sensor 24, a determining module 25, a display 26, a mode changing module 28, a control module 30, an analyzing module 32 and a processor 40. The processor 40 for executing programs associated with the determining module 25, the mode changing module 28, the control module 30 and the analyzing module 32. The handheld device 100 includes two input modes, a first input mode and a second input mode.

The touch sensor 24 is connected to the touch screen 22 to sense touch operations on the touch screen 22. According to an input character operation on the touch screen 22, the control module 30 controls the display 26 to display a default input mode and a mode changing icon 34. The default input mode is the second input mode. A touch operation on the mode changing icon 34 can cause the mode changing module 28 to change the input mode.

In the second input mode, the control module 30 controls the display 26 to display a second virtual keyboard 40 and a character input area 42. The second virtual keyboard 40 is same as a commonly-known virtual keyboard. The second virtual keyboard 40 is displayed at the bottom of the touch screen 22 and extends largely across the width direction of the handheld device 100. Characters are touched in the character input area 42.

In the first input mode, the control module 30 controls the display 26 to display a first virtual keyboard 46, an input operation area 48, and a character input area 42. The first virtual keyboard 46 includes a center area 50 and a number of character selecting areas 52 surrounding the center area 50. The center area 50 displays a closed polygon. Each character selecting area 52 is adjacent to one side of the polygon. Each character selecting area 52 includes a number of characters. Each character selecting area 52 is positioned at a first preset angle range around a center point of the center area 50.

In the embodiment, the center area 50 displays an octagon. Eight character selecting areas 52 are adjacent to eight sides of the octagon. The eight character selecting areas 52 are each the same rectangle. Each character selecting area 52 is positioned on the first preset angle range. The input operation area 48 is set on an area of the touch screen 22 which may be easily operated with one hand. For example, the input operation area 48 is set on righthand and bottom of the touch screen 22. The user selects characters of the first virtual keyboard 46 through the input operation area 48.

Figure 4:
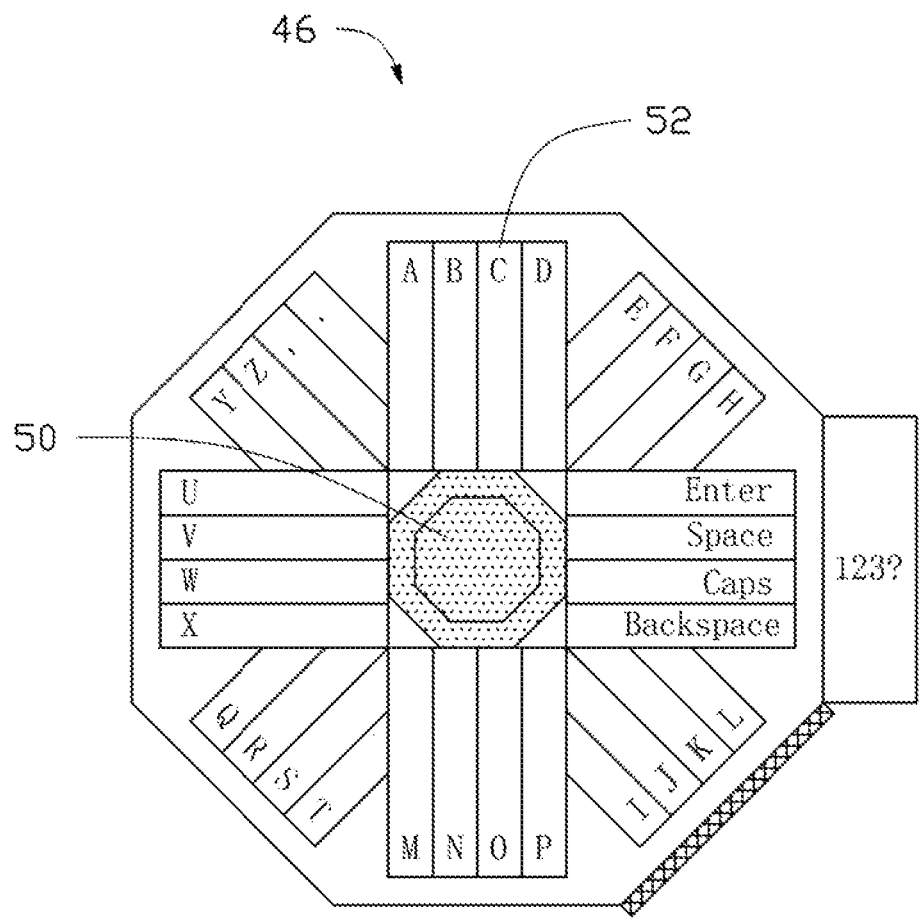
FIG. 4 is a schematic diagram of a central area of a first virtual keyboard of the handheld device in FIG. 3.

When the handheld device 100 is in the first input mode, the touch sensor 24 senses a touch start point when the input operation area 48 is pressed. The touch sensor 24 further senses a first coordinate angle of a first direction from which the touch start point slides. The determining module 25 can determine the first coordinate angle as corresponding to the first preset angle range of the character selecting area 52. FIG. 4 illustrates that, when the input operation area 48 is pressed, the control module 30 controls the display 26 to display a selection mark on the center area 50. The center area 50 may be colored.

Figure 5:
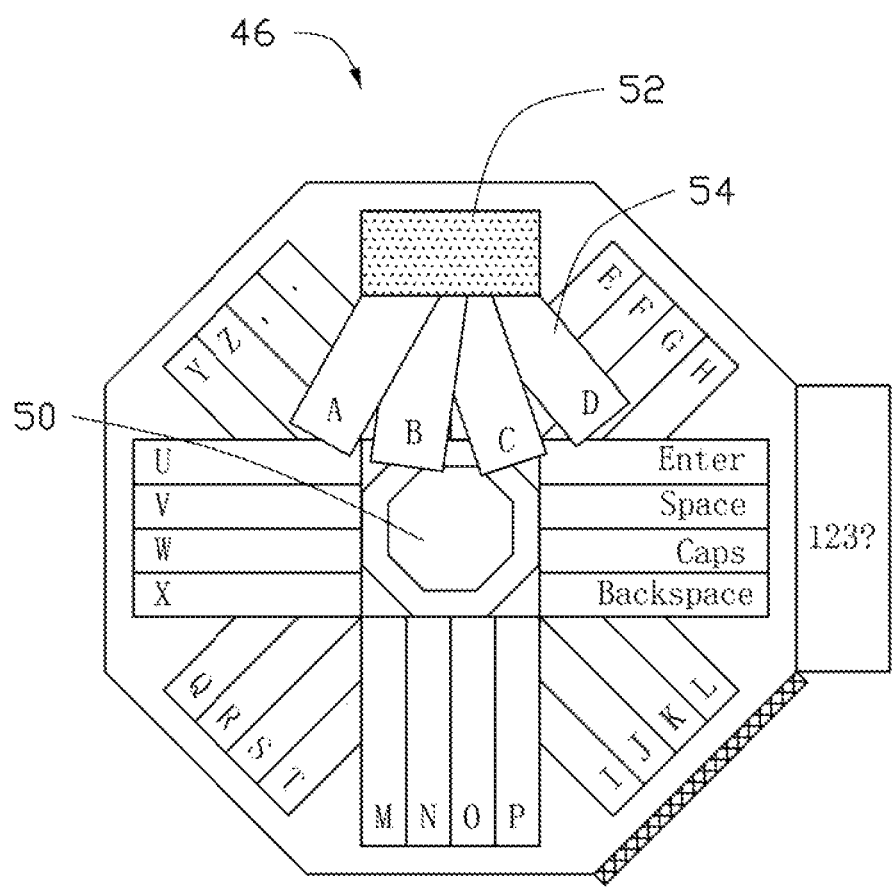
FIG. 5 is a schematic diagram of a character selecting area being selected in the device of FIG. 3.

FIG. 5 illustrates that, according to the particular character selecting area 52, the control module 30 controls the display 26 to display a number of character bars 54 adjacent to the determined character selecting area 52. Each character bar 54 includes a character in the determined character selecting area 52. The number of character bars 54 radiate from the center area 50. Each character bar 54 is arranged as part of a fan shape and positioned a second preset angle range of a coordinate with a center point of the determined character selecting area 52 being an original of the coordinate.

The touch sensor 24 further senses a first end point along the first direction and a second coordinate angle of a second direction from the first end point slides in a coordinate with an original of the coordinate is the first end point. The determining module 25 further determines the character bars 54 that the second coordinate angle of the second preset angle range corresponds to. According to the determined character bars 54, the control module 30 controls the display 26 to display the character of the determined character bars 54 in the character input area 42. Thereby, a character may be input in the character input area 42.

The first virtual keyboard 46 further includes at least one changing area 56. The changing areas 56 surround the character selecting areas 52. Each changing area 56 displays a character class, for example alphabetical, numerical, or special characters. The touch sensor 24 further senses in real time a first distance between the touch start point and present touch point along the first direction. When the first distance is smaller than a first preset distance, the display 26 does not display the number of character bars 54 adjacent to the determined character selecting area 52.

Figure 6:
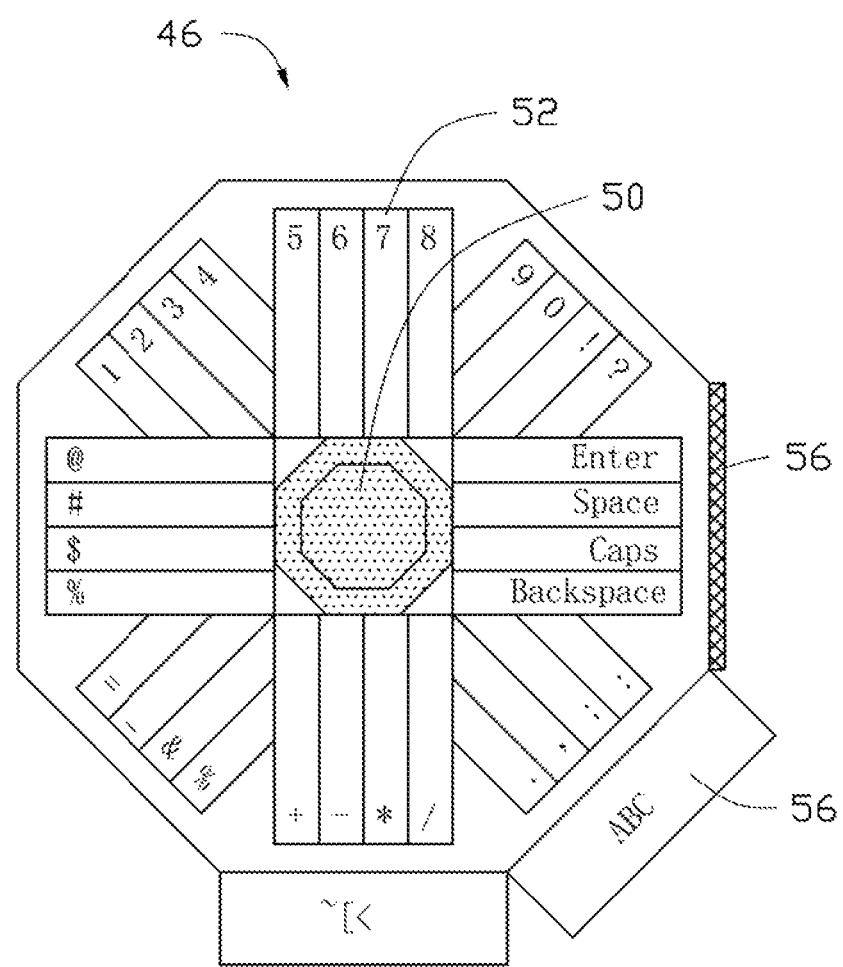
FIG. 6 is a schematic diagram of the changed character selecting area in the device in FIG. 3.

FIG. 6 illustrates that when the first distance reaches the first preset distance, the control module 30 controls the display 26 to display characters of the character class of the changing area 56 surrounding the determined character selecting area 52 in each character selecting area 52. For example, the changing area 56 may display numerals and general symbols, the display 26 may display numbers and general symbols in the character selecting areas 52. The control module 30 further controls the display 26 to display a smaller changing area 56 and display a previous character class in another changing area 56. For example, before a character selecting area 52 is changed, the character selecting area 52 may display the alphabet, but the control module 30 may control the display 26 to display the alphabet in another changing area 56. Thus, the user can select character class for inputting.

Figure 7:
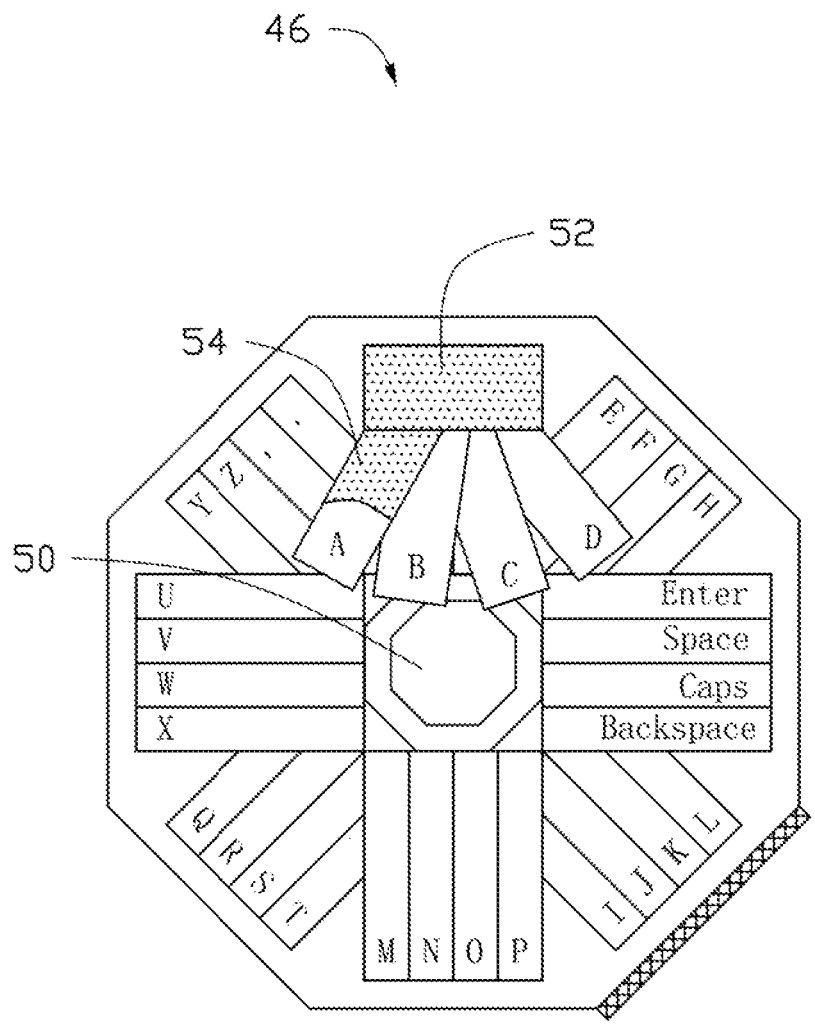
FIG. 7 is a schematic diagram of a changed character bar in the device bin FIG. 5.

FIG. 7 illustrates that the display 26 displays the selecting mark on the character bars 54. Thus, the user can know which character is selected. During the sliding along the second direction from the first end point, the touch sensor 24 further senses in real time a second distance between the first end point and present touch point. Until the second distance reaches a preset second distance, the control module 30 controls the display 26 to display the character of the determined character bars 54 in the character input area 42.

In another embodiment, the second distance may be smaller than the preset second distance, and the touch sensor 24 further senses a remaining time. When the remaining time is longer than a preset time, the present point is treated as a new first end point. Before the second distance reaches the preset second distance, the touch sensor 24 senses the remaining time. When the second distance reaches the preset second distance, the touch sensor 24 stops sensing the remaining time.

Figure 8:
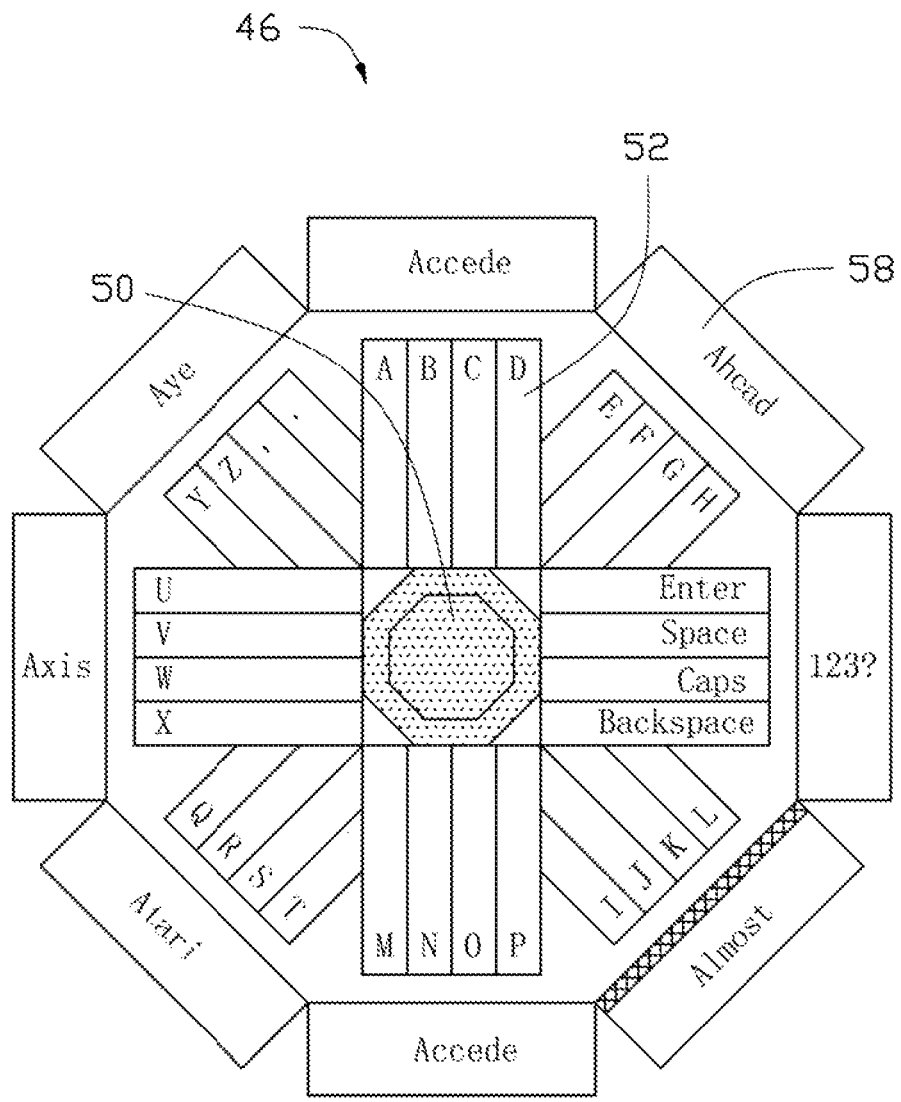
FIG. 8 is a schematic diagram of the first virtual keyboard having word bars in the device in FIG. 3.

FIG. 8 illustrates that the analyzing module 32 analyzes words matching the character in the character input area 42. The control module 30 controls the display 26 to display a preset number of word bars 58 surrounding the character selecting areas 52. Each word bar 58 includes a word. Each word bar 58 is positioned at a third preset angle range of the coordinate with the center point of the center area 50 being the original of the coordinate. The touch sensor 24 further senses a second end point of the second direction and a third coordinate angle of a third direction from which the second end point slides in a coordinate with an original of the coordinate is the second end point. The touch sensor 24 further senses a third distance between the second end point and present touch point along the third direction.

According to the third distance and the third coordinate angle, the determining module 25 determines which word bars 58 or character selecting area 52 is selected. When the third distance is smaller than a third preset distance, the determining module 25 determines the character selecting area 52 of the first preset angle range that the third coordinate angle corresponds to. The control module 30 controls the display 26 to display the number of character bars 54 adjacent to the determined character selecting area 52. When the third distance reaches the preset third distance, the determining module 25 determines the word bars 58 of the third preset angle range to which the third coordinate angle corresponds. The control module 30 controls the display 26 to display the word of the determined word bars 58 in the character input area 42 and controls the display 26 not to display the number of character bars 54. Thus, the user can input a whole word through the word in the word bars 58.

Figure 9:
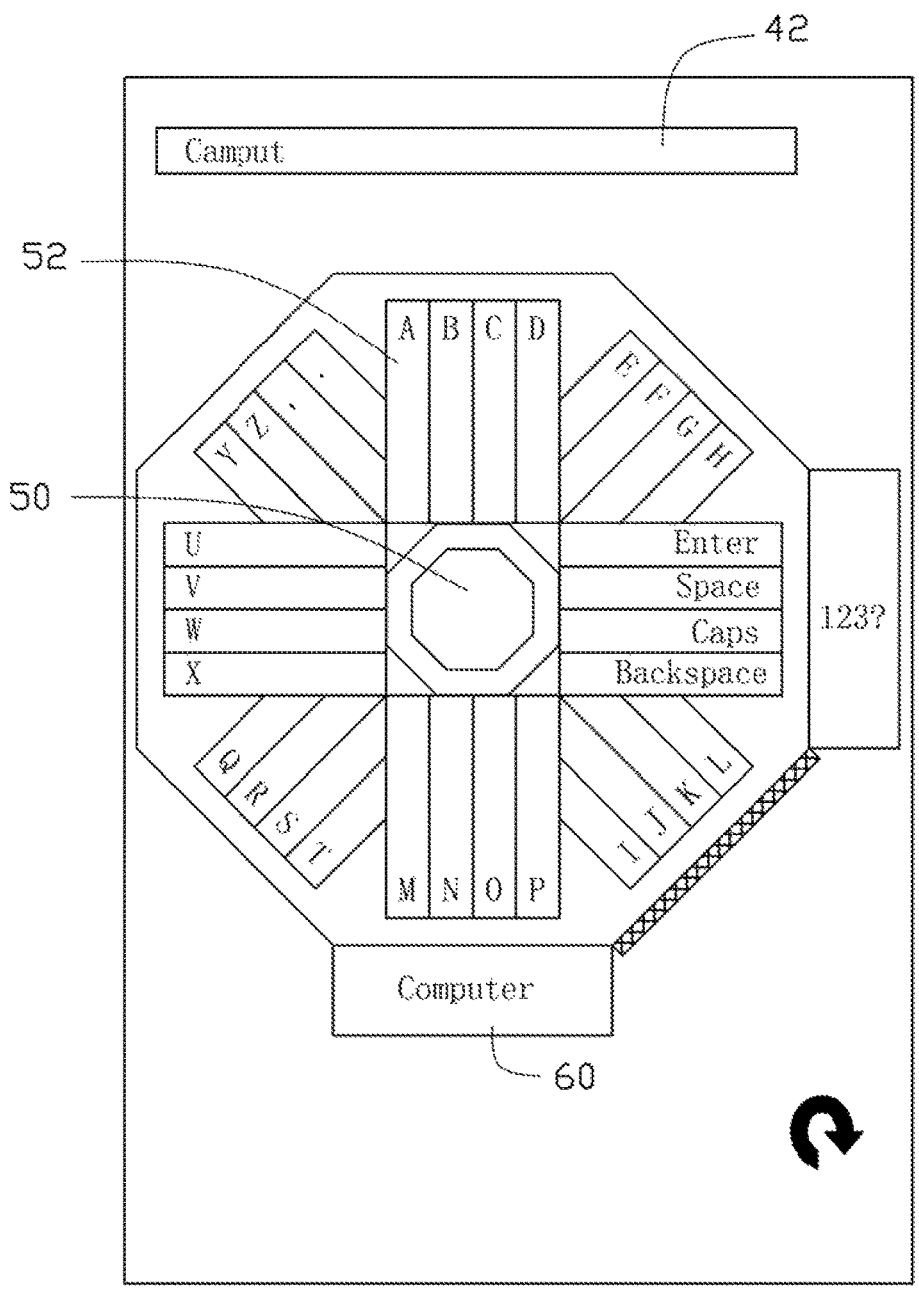
FIG. 9 is a schematic diagram of the first virtual keyboard having correction terms in the device in FIG. 3.

FIG. 9 illustrates that the analyzing module 32 analyzes whether the word in the character input area 42 is correct and provides at least one alternative word when the word in the character may be wrong. The control module 30 controls the display 26 to display the at least one intended word bar 60 surrounding at least one character selecting area 52. Each intended word bar 60 includes one intended word. Each intended word bar 60 is positioned at a fourth preset angle range of the coordinate with the center point of the center area 50 being the original of the coordinate. The touch sensor 24 further senses a fourth coordinate angle of a fourth direction from which the second end point slides in the coordinate which the original of the coordinate is the second end point. The touch sensor 24 further senses a fourth distance between the second end point and present touch point along the fourth direction.

According to the fourth distance and the fourth coordinate angle, the determining module 25 determines which intended word bar 60 or character selecting area 52 is selected. When the fourth distance is smaller than a fourth preset distance, the determining module 25 determines that the fourth coordinate angle is corresponding to a certain character selecting area 52 of the first preset angle range. The control module 30 controls the display 26 to display the number of character bars 54 adjacent to the determined character selecting area 52. When the fourth distance reaches the preset fourth distance, the determining module 25 determines that the fourth coordinate angle is corresponding to a certain intended word bar 60 of the fourth preset angle range. The control module 30 controls the display 26 to display the intended word of the determined intended word bars 60 in the character input area 42 and controls the display 26 not to display the number of character bars 54. Thus, the user can input a word through the intended word in the intended word bars 60.

Figure 10:
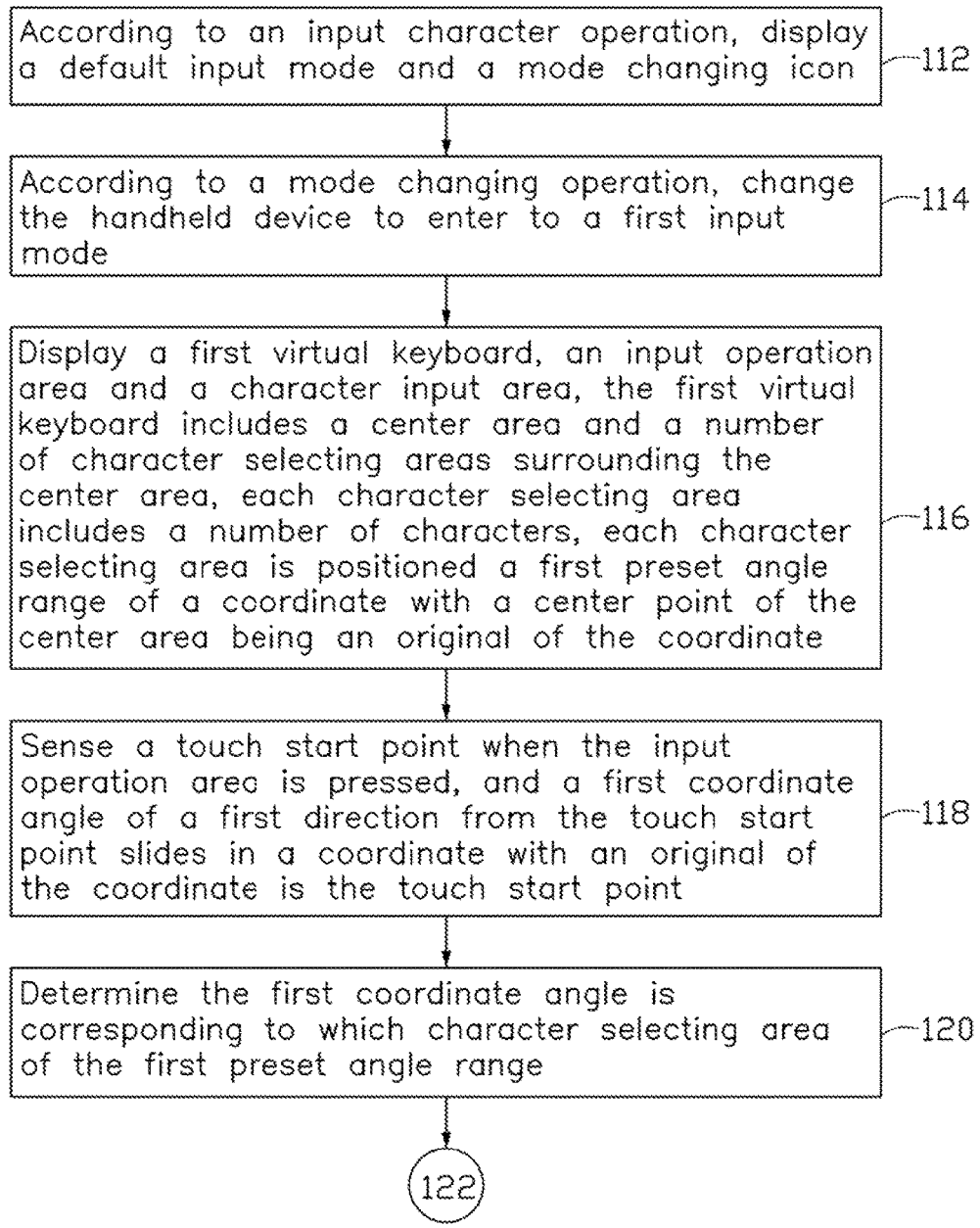
FIGS. 10-11 are a flowchart of an input method applied to the device of FIG. 1, according to a first embodiment.
Figure 11:
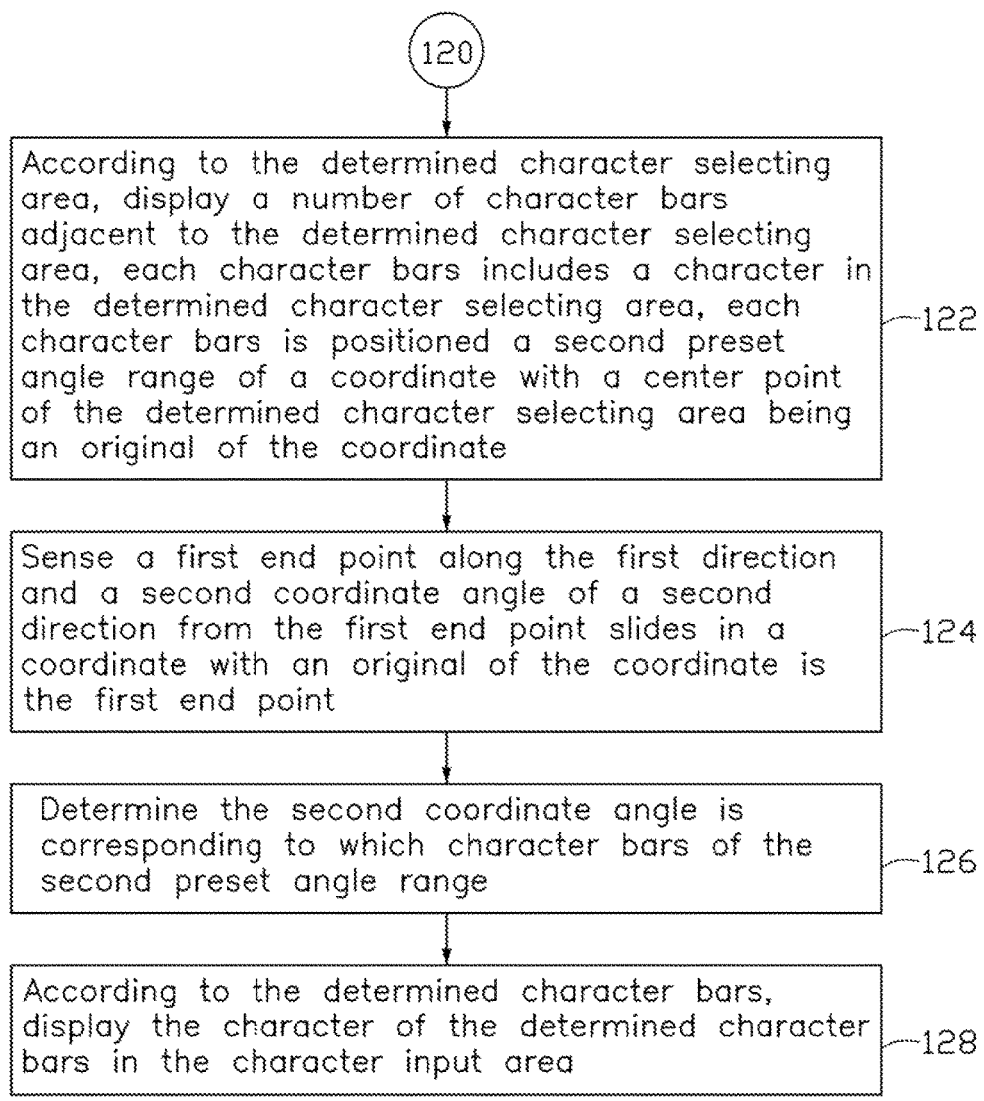

FIGS. 10-11 illustrate an input method according to a first embodiment. The order of blocks in FIG. 10 is illustrative only and the order of the blocks can change. Additional blocks can be added or fewer blocks may be utilized without departing from this disclosure. The exemplary method begins at block 112.

At block 112, according to an input character operation on the touch screen 22, the control module 30 controls the display 26 to display a default input mode and a mode changing icon 34.

At block 114, according to a mode changing operation on the mode changing icon 34, the mode changing module 28 changes the handheld device 100 to enter to a first input mode.

At block 116, the control module 30 controls the display 26 to display a first virtual keyboard 46, an input operation area 48 and a character input area 42, the first virtual keyboard 46 includes a center area 50 and a number of character selecting areas 52 surrounding the center area 50, each character selecting area 52 includes a number of characters, each character selecting area 52 is positioned a first preset angle range of a coordinate with a center point of the center area 50 being an original of the coordinate.

At block 118, the touch sensor 24 senses a touch start point when the input operation area 48 is pressed, and a first coordinate angle of a first direction from the touch start point slides in a coordinate with an original of the coordinate is the touch start point.

At block 120, the determining module 25 determines the first coordinate angle is corresponding to which character selecting area 52 of the first preset angle range.

At block 122, according to the determined character selecting area 52, the control module 30 controls the display 26 to display a number of character bars 54 adjacent to the determined character selecting area 52, each character bars 54 includes a character in the determined character selecting area 52, each character bars 54 is positioned a second preset angle range of a coordinate with a center point of the determined character selecting area 52 being an original of the coordinate.

At block 124, the touch sensor 24 senses a first end point along the first direction and a second coordinate angle of a second direction from the first end point slides in a coordinate with an original of the coordinate is the first end point.

At block 126, the determining module 25 determines the second coordinate angle is corresponding to which character bars 54 of the second preset angle range.

At block 128, according to the determined character bars 54, the control module 30 controls the display 26 to display the character of the determined character bars 54 in the character input area 42.

According to FIG. 12, in a second embodiment, at block 116, the control module 30 further controls the display 26 to display a changing area 56, the changing area 56 surrounds the character selecting area 52, each changing area 56 displays a character class, and the input method further includes blocks 117 and 119.

At block 117, the touch sensor 24 senses a first distance between the touch start point and present touch point along the first direction in real time.

At block 119, when the first distance reaches a first preset distance, the control module 30 controls the display 26 to display characters of the character class of the changing area 56 surrounding the determined character selecting area 52 in each character selecting area 52.

Figure 13:
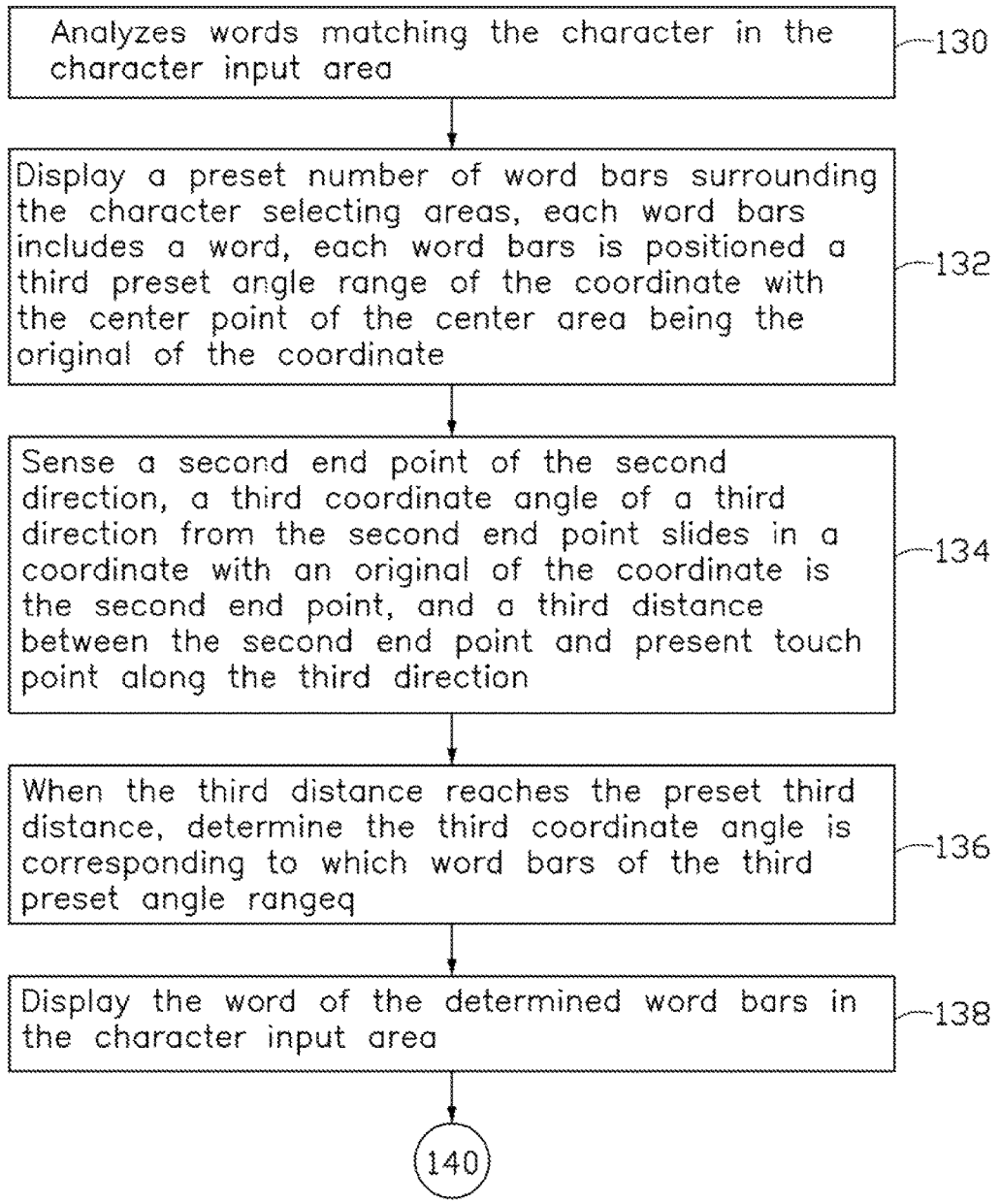
FIGS. 13-14 are a flowchart of an input method applied to the device of FIG. 1, according to a third embodiment.
Figure 14:
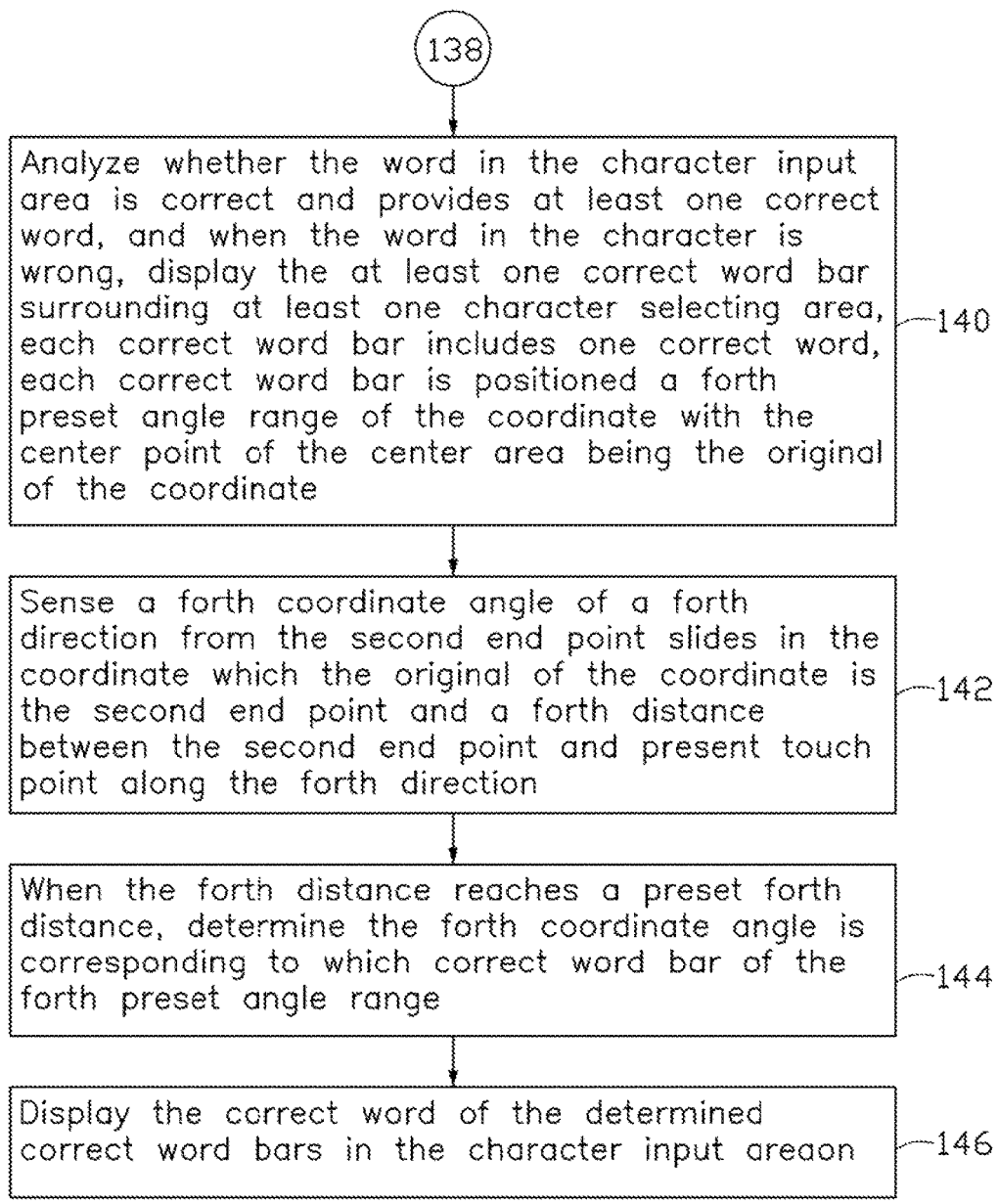

According to FIGS. 13-14, in a third embodiment, the input method further includes following blocks 130-146.

At block 130, the analyzing module 32 analyzes words matching the character in the character input area 42.

At block 132, The control module 30 controls the display 26 to display a preset number of word bars 58 surrounding the character selecting areas 52, each word bars 58 includes a word, each word bars 58 is positioned a third preset angle range of the coordinate with the center point of the center area 50 being the original of the coordinate.

At block 134, the touch sensor 24 senses a second end point of the second direction, a third coordinate angle of a third direction from the second end point slides in a coordinate with an original of the coordinate is the second end point, and a third distance between the second end point and present touch point along the third direction.

At block 136, when the third distance reaches the preset third distance, the determining module 25 determines the third coordinate angle is corresponding to which word bars 58 of the third preset angle range.

At block 138, the control module 30 controls the display 26 to display the word of the determined word bars 58 in the character input area 42.

At block 140, the analyzing module 32 analyzes whether the word in the character input area 42 is intended and provides at least one intended word, and when the word in the character is wrong, the control module 30 controls the display 26 to display the at least one intended word bar 60 surrounding at least one character selecting area 52, each intended word bar 60 includes one intended word, each intended word bar 60 is positioned a fourth preset angle range of the coordinate with the center point of the center area 50 being the original of the coordinate.

At block 142, the touch sensor 24 senses a fourth coordinate angle of a fourth direction from the second end point slides in the coordinate which the original of the coordinate is the second end point and a fourth distance between the second end point and present touch point along the fourth direction.

At block 144, when the fourth distance reaches a preset fourth distance, the determining module 25 determines the fourth coordinate angle is corresponding to which correct word bar 60 of the fourth preset angle range.

At block 146, the control module 30 controls the display 26 to display the intended word of the determined intended word bars 60 in the character input area 42.

The shown and described above are only examples. Even though numerous characteristics and advantages of the present technology have been set fourth in the foregoing description, together with details of the structure and function of the present disclosure, the disclosure is illustrative only, and changes may be made in the detail, comprising in matters of shape, size, and arrangement of the parts within the principles of the present disclosure, up to the full extent established by the broad general meaning of the terms used in the claims.

What is claimed is:

1. A handheld device, the handheld device comprising:
   a touch screen;
   a display;
   a control module configured to control the display to display a first virtual keyboard, an input operation area and a character input area in a first input mode, the first virtual keyboard comprises a center area and a plurality of character selecting areas surrounding the center area, each character selecting area comprises a plurality of characters, each character selecting area is positioned a first preset angle range of a coordinate with a center point of the center area being an original of the coordinate,
   a touch sensor configured to sense a touch start point when the input operation area is pressed and a first coordinate angle of a first direction from the touch start point slides in a coordinate with an original of the coordinate is the touch start point;
   a determining module configured to determine the first coordinate angle is corresponding to which character selecting area of the first preset angle range;

the control module further configured to, according to the determined character selecting area, control the display to display a plurality of character bars adjacent to the determined character selecting area, each character bars comprises a character in the determined character selecting area, each character bars is positioned a second preset angle range of a coordinate with a center point of the determined character selecting area being an original of the coordinate;

the touch sensor further configured to sense a first end point along the first direction, and a second coordinate angle of a second direction from the first end point slides in a coordinate with an original of the coordinate is the first end point;

the determining module further configured to determine the character bars that the second coordinate angle of the second preset angle range corresponds to;

the control module further configured to, according to the determined character bars, control the display to display the character of the determined character bars in the character input area; and at least one processor for executing programs associated with at least one of the determining module and the control module.

2. The handheld device as claimed in claim 1, wherein the handheld device further has a second input mode, the handheld device further comprises a mode changing module, in response to changing input mode operation, the mode changing module changes the handheld device between the first input mode and the second input mode.

3. The handheld device as claimed in claim 2, wherein according to an input character operation on the touch screen, the control module controls the display to display a default input mode and a mode changing icon, the changing input mode operation is operated on the mode changing icon.

4. The handheld device as claimed in claim 3, wherein the default input mode is the second input mode, in the second input mode, the control module controls the display to display a second virtual keyboard, the second virtual keyboard is same as a virtual keyboard of general phones.

5. The handheld device as claimed in claim 1, wherein the input operation area is set on right and bottom of the touch screen.

6. The handheld device as claimed in claim 1, wherein the center area displays an octagon, eight character selecting areas are adjacent to eight sides of the octagon, eight character selecting areas are rectangles.

7. The handheld device as claimed in claim 1, wherein the plurality of character bars are arranged a sector toward the center area.

8. The handheld device as claimed in claim 1, wherein the first virtual keyboard further includes at least one changing areas, the changing areas surround the character selecting areas, each changing area displays a character class, the touch sensor further senses a first distance between the touch start point and present touch point along the first direction in real time, until the first distance reaches a first preset distance, the control module controls the display to display characters of the character class of the changing area surrounding the determined character selecting area in each character selecting area.

9. The handheld device as claimed in claim 1, wherein when the input operation area is pressed, the control module controls the display to display a selecting mark on the center area.

10. The handheld device as claimed in claim 9, wherein the center area is marked with a color.

11. The handheld device as claimed in claim 1, wherein the touch sensor further senses a second distance between the first end point and present touch point in real time, until the second distance reaches a preset second distance, the control module controls the display to display the character of the determined character bars in the character input area.

12. The handheld device as claimed in claim 1, wherein the handheld further comprises a analyzing module configured to analyze words matching the character in the character input area, the control module further controls the display to display a preset number of word bars surrounding the character selecting areas, each word bars comprises a word, each word bars is positioned a third preset angle range of the coordinate with the center point of the center area being the original of the coordinate, the touch sensor further senses a second end point of the second direction, a third coordinate angle of a third direction from the second end point slides in a coordinate with an original of the coordinate is the second end point, and a third distance between the second end point and present touch point along the third direction, according to the third distance and the third coordinate angle, the determining module determines which word bars or character selecting area is selected, the control module controls the display to display the word of the determined word bars in the character input area.

13. The handheld device as claimed in claim 12, wherein when the third distance is smaller than a third preset distance, the determining module determines the third coordinate angle is corresponding to which character selecting area of the first preset angle range, the control module controls the display to display the number of character bars adjacent to the determined character selecting area, when the third distance reaches the preset third distance, the determining module determines the third coordinate angle is corresponding to which word bars of the third preset angle range, the control module controls the display to display the word of the determined word bars in the character input area.

14. The handheld device as claimed in claim 13, wherein when the third distance reaches the preset third distance, the control module controls the display does not to display the number of character bars.

15. An input method comprising:

according to an operation on a touch screen of a handheld device, making the handheld device enter to a first input mode;

displaying a first virtual keyboard, an input operation area and a character input area, the first virtual keyboard includes a center area and a number of character selecting areas surrounding the center area, each character selecting area includes a number of characters, each character selecting area is positioned a first preset angle range of a coordinate with a center point of the center area being an original of the coordinate;

sensing a touch start point when an input operation area of the touch screen is pressed, and a first coordinate angle of a first direction from the touch start point slides in a coordinate with an original of the coordinate is the touch start point;

determining the first coordinate angle is corresponding to which character selecting area of the first preset angle range;

displaying a number of character bars adjacent to the determined character selecting area, each character bars includes a character in the determined character selecting area, each character bars is positioned a second preset angle range of a coordinate with a center point of the determined character selecting area being an original of the coordinate;

sensing a first end point along the first direction and a second coordinate angle of a second direction from the first end point slides in a coordinate with an original of the coordinate is the first end point;

determining the second coordinate angle is corresponding to which character bars of the second preset angle range; and displaying the character of the determined character bars in the character input area.

16. The input method as claimed in claim 15, wherein in first input mode, further displaying a changing area, the s changing area surrounds the character selecting area, each changing area displays a character class, and the input method further comprising:

sensing a first distance between the touch start point and present touch point along the first direction in real time; and when the first distance reaches to a first preset distance, displaying characters of the character class of the changing area surrounding the determined character selecting area in each character selecting area.

17. The input method as claimed in claim 15, further comprising:

analyzing words matching the character in the character input area;

displaying a preset number of word bars surrounding the character selecting areas, each word bars includes a word, each word bars is positioned a third preset angle range of the coordinate with the center point of the center area being the original of the coordinate;

sensing a second end point of the second direction, a third coordinate angle of a third direction from the second end point slides in a coordinate with an original of the coordinate is the second end point, and a third distance between the second end point and present touch point along the third direction;

when the third distance reaches the preset third distance, determining the third coordinate angle is corresponding to which word bars of the third preset angle range; and displaying the word of the determined word bars in the character input area.

18. The input method as claimed in claim 15, further comprising:

analyzing whether the word in the character input area is intended and provides at least one intended word, and when the word in the character is wrong, displaying the at least one intended word bar surrounding at least one character selecting area, each intended word bar includes one intended word, each intended word bar is positioned a fourth preset angle range of the coordinate with the center point of the center area being the original of the coordinate;

sensing a fourth coordinate angle of a fourth direction from the second end point slides in the coordinate which the original of the coordinate is the second end point and a fourth distance between the second end point and present touch point along the fourth direction;

when the fourth distance reaches a preset fourth distance, determines the fourth coordinate angle is corresponding to which correct word bar of the fourth preset angle range; and displaying the intended word of the determined intended word bars in the character input area.

19. The input method as claimed in claim 15, further comprising:

when the input operation area is pressed, displaying a selecting mark on the center area.

20. The input method as claimed in claim 15, wherein the plurality of character bars are arranged a sector toward the center area.

\* \* \* \* \*